United States Patent
Hwang et al.

(10) Patent No.: US 12,542,315 B2
(45) Date of Patent: Feb. 3, 2026

(54) SECONDARY BATTERY

(71) Applicant: SK ON CO., LTD., Seoul (KR)

(72) Inventors: Chang Mook Hwang, Daejeon (KR); Ji Hyung Kim, Daejeon (KR); Gyeong Min Ryu, Daejeon (KR); Sin Young Moon, Daejeon (KR); Yoon Ji Jo, Daejeon (KR)

(73) Assignee: SK On Co., Ltd., Seoul (KR)

( * ) Notice: Subject to any disclaimer, the term of this patent is extended or adjusted under 35 U.S.C. 154(b) by 451 days.

(21) Appl. No.: 17/733,073

(22) Filed: Apr. 29, 2022

(65) Prior Publication Data
US 2022/0352577 A1    Nov. 3, 2022

(30) Foreign Application Priority Data
May 3, 2021    (KR) .......................... 10-2021-0057156

(51) Int. Cl.
*H01M 10/6572*    (2014.01)
*H01M 10/654*    (2014.01)

(52) U.S. Cl.
CPC ..... *H01M 10/6572* (2015.04); *H01M 10/654* (2015.04)

(58) Field of Classification Search
None
See application file for complete search history.

(56) References Cited

U.S. PATENT DOCUMENTS

| | | | |
|---|---|---|---|
| 9,666,914 B2 | 5/2017 | Bell et al. | |
| 2008/0136364 A1 | 6/2008 | Calvarese | |
| 2014/0030560 A1* | 1/2014 | Lev | B60L 50/16 |
| | | | 429/90 |
| 2015/0244042 A1 | 8/2015 | Bell et al. | |
| 2017/0256833 A1* | 9/2017 | Ciaccio | H01M 16/00 |
| 2019/0356030 A1* | 11/2019 | Venkatasubramanian | |
| | | | H01L 23/38 |
| 2021/0257693 A1* | 8/2021 | Lee | H01M 10/613 |

FOREIGN PATENT DOCUMENTS

| | | |
|---|---|---|
| CN | 111916872 A | 11/2020 |
| DE | 102014018774 A1 | 6/2016 |
| DE | 102018205363 A1 | 10/2019 |

(Continued)

OTHER PUBLICATIONS

Extended European Search Report for the European Patent Application No. 22171319.1 issued by the European Patent Office on Oct. 5, 2022.

*Primary Examiner* — Brian R Ohara
*Assistant Examiner* — M. T. Leonard
(74) *Attorney, Agent, or Firm* — IP & T GROUP LLP (57) ABSTRACT

A secondary battery is provided in the present application. The secondary battery includes an electrode assembly including a cathode and an anode facing the cathode, thermoelectric elements columns arranged on a surface of the electrode assembly, and a circuit structure that electrically connects the thermoelectric element columns. The circuit structure includes a series/parallel switching unit configured to switch a connection between the thermoelectric element columns from a series connection to a parallel connection or from a parallel connection to a series connection. The thermoelectric element columns are connected selectively in parallel or in series to improve rapid charging and life-span properties.

11 Claims, 2 Drawing Sheets

(56) References Cited

FOREIGN PATENT DOCUMENTS

| KR | 10-2011-0128639 | A |   | 11/2011 |           |
|----|-----------------|---|---|---------|-----------|
| KR | 10-1283344      | B1|   | 7/2013  |           |
| KR | 10-1522164      | B1|   | 5/2015  |           |
| KR | 10-1640882      | B1|   | 7/2016  |           |
| KR | 10-2018-0023817 | A |   | 3/2018  |           |
| KR | 20200065194     | A | * | 6/2020  | H01M 10/613 |

* cited by examiner

SECONDARY BATTERY

CROSS-REFERENCE TO RELATED APPLICATION

This application claims priority to Korean Patent Application No. 10-2021-0057156 filed on May 3, 2021 in the Korean Intellectual Property Office (KIPO), the entire disclosure of which is incorporated by reference herein.

BACKGROUND

1. Field

The present invention relates to a secondary battery. More particularly, the present invention relates to a secondary battery including an electrode assembly and a circuit structure.

2. Description of the Related Art

A secondary battery capable of being charged and discharged is being actively developed with developments of advanced technical products such as a digital camera, a cell phone, a laptop computer, a hybrid vehicle, etc. Examples of the secondary battery include a nickel-cadmium battery, a nickel-metal hydride battery, a nickel-hydrogen battery, a lithium secondary battery, etc.

The lithium secondary battery is highlighted due to high operational voltage and energy density per unit weight, a high charging rate, a compact dimension, etc.

For example, the lithium secondary battery may have an operating voltage of 3.6V or higher, and may be used as a power source for a portable electronic device. Further, a plurality of lithium secondary batteries may be connected in series in the form of a battery pack to be employed to, e.g., a high-power hybrid vehicle.

Battery performance such as power and capacity may be gradually deteriorated during a long-term storage and repeated charging/discharging. For example, by-products may be formed by decomposition of an active material and an electrolyte during the storage or the repeated charging/discharging, or by a reaction between the active material and the electrolyte to deteriorate the battery performance.

Particularly, in a tab portion of the secondary battery, a temperature may be increased rapidly as a high current flows through a narrow path. A heat generated in the tab portion may be transferred to a secondary battery pouch, and a sealing portion of the secondary battery pouch adjacent to the tab portion may be melted.

Accordingly, a leakage of the electrolyte may be caused from the secondary battery. Further, as a temperature at the secondary battery pouch becomes increased, a side reaction in the electrolyte may also occur.

For example, Korean Published. Patent Application No. 10-2018-0023817 discloses a pouch-type secondary battery in which a battery cell accommodating portion is formed at a pouch film through a pressing process and battery cells are introduced in the accommodating portion, but fails to suggest any means for cooling the heat generated at the tab portion of the secondary battery.

SUMMARY

According to an aspect of the present invention, there is provided a lithium secondary battery having improved mechanical stability and rapid charging property.

According to exemplary embodiments, a secondary battery includes an electrode assembly including a cathode and an anode facing the cathode, thermoelectric elements columns arranged on a surface of the electrode assembly, and a circuit structure that electrically connects the thermoelectric element columns. The circuit structure includes a series/parallel switching unit configured to switch a connection between the thermoelectric element columns from a series connection to a parallel connection or from a parallel connection to a series connection.

In some embodiments, the thermoelectric element columns may be arranged along a length direction of the electrode assembly.

In some embodiments, the series/parallel switching unit may include a plurality of series/parallel switching units corresponding to each of the thermoelectric element columns. The plurality of series/parallel switch units may include a first series/parallel switching unit configured to connect different thermoelectric element columns in parallel or electrically separate the different thermoelectric element columns, and a second series/parallel switching unit configured to connect neighboring thermoelectric element columns in series or electrically separate the neighboring thermoelectric element columns.

In some embodiments, the first series/parallel switching unit may include a first connection unit and a first circuit intermediate unit that may be selectively in contact with or spaced apart from the first connection unit. The second series/parallel switching unit may include a second connection unit, and a second circuit intermediate unit that may be selectively in contact with or spaced apart from the second connection unit.

In some embodiments, distances between the thermoelectric element columns may be uniform.

In some embodiments, each of the thermoelectric element columns may include at least two thermoelectric elements arranged in a width direction of the electrode assembly.

In some embodiments, each of the thermoelectric elements may include a P-type semiconductor layer and an N-type semiconductor layer, and the P-type semiconductor layer and the N-type semiconductor layer may be alternately arranged in each of the thermoelectric element columns.

In some embodiments, the thermoelectric element columns may be arranged so that the P-type semiconductor layer and the N-type semiconductor layer may face each other in a length direction of the electrode assembly.

In some embodiments, some of the thermoelectric element columns may be connected to each other in parallel, and remaining ones of the thermoelectric element columns may be connected to each other in series.

In some embodiments, the electrode assembly may further include a cathode tab protruding from the cathode and an anode tab protruding from the anode, and the cathode tab and the anode tap may be electrically connected to at least one of the thermoelectric element columns.

In some embodiments, the secondary battery may further include a case accommodating the electrode assembly and the thermoelectric element columns.

In some embodiments, the secondary battery may further include a case accommodating the electrode assembly, and the thermoelectric element columns may be disposed at an outside of the case.

In a secondary battery according to embodiments of the present invention, thermoelectric element columns may be disposed on a surface of an electrode assembly. The thermoelectric element columns may be electrically connected by a circuit structure, and the circuit structure may include a series/parallel switch unit for switching the connection of the thermoelectric element column from a series connection to a parallel connection or from the parallel connection to the series connection.

In exemplary embodiments, while performing a rapid charging of the secondary battery, the thermoelectric element columns may be selectively connected in series or parallel, and the connection of the thermoelectric element columns may be switched from the series connection to the parallel connection or from the parallel connection to the series connection. Accordingly, an energy efficiency may be maintained while an individual cooling or heating is locally implemented during the rapid charging of the secondary battery.

In some embodiments, the secondary battery may further include a current supply unit electrically connecting the thermoelectric element column and an anode tab and/or a cathode tab of the electrode assembly. In this case, a thermoelectric element included in the thermoelectric element column may convert a heat generated from the electrode assembly during the rapid charging into an electric current to transfer to the secondary battery. Accordingly, a rate of the rapid charging of the secondary battery may be increased, and the energy efficiency may be further improved.

DETAILED DESCRIPTION OF THE EMBODIMENTS

According to exemplary embodiments of the present invention, a secondary battery including a thermoelectric element column is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
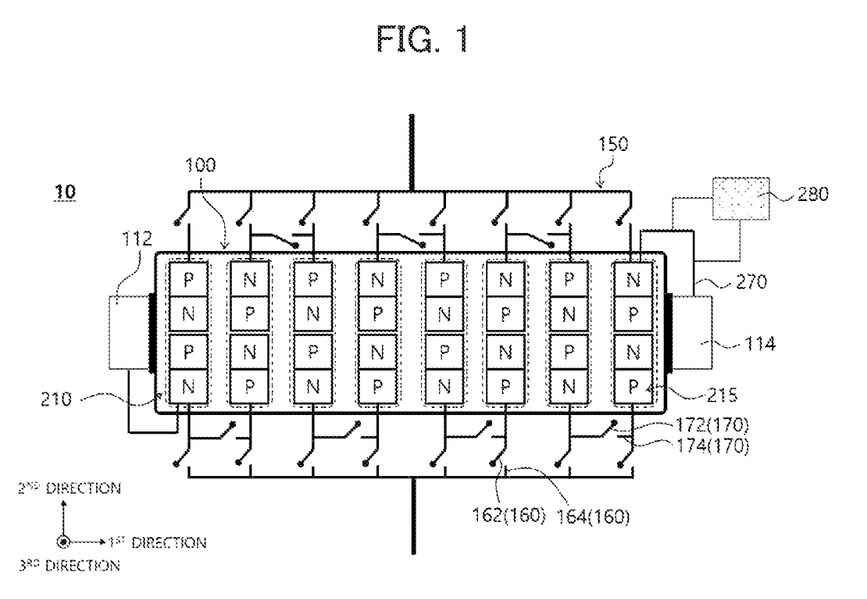
FIG. 1 is a schematic top planar view illustrating a secondary battery in accordance with exemplary embodiments.

FIG. 1 is a schematic top planar view illustrating a secondary battery in accordance with exemplary embodiments.

For example, in FIG. 1, a first direction is a direction connecting both ends at which electrode tabs 112 and 114 may be disposed in the electrode assembly 100 (e.g., a length direction of the electrode assembly 100), a second direction is a direction perpendicular to the first direction in a plan view (e.g., a width direction of the electrode assembly 100), and a third direction is a vertical direction to the first and second direction in which cathodes and anodes of the electrode assembly 100 may be stacked (e.g., a thickness direction of the electrode assembly 100). For example, the above-described definitions of the first to third directions may be equally applied to accompanying drawings.

Referring to FIG. 1, in exemplary embodiments, a secondary battery 10 may include an electrode assembly 100 including a cathode and an anode electrode facing the cathode, thermoelectric element columns 210 arranged on a surface of the electrode assembly 100, and a circuit structure 150 electrically connecting the thermoelectric element columns 210 to each other.

For example, the thermoelectric element columns 210 may be arranged along the length direction (e.g., the first direction) of the electrode assembly 100.

For example, the electrode assembly 100 may further include a separation layer disposed between the cathode and the anode.

For example, a temperature of the secondary battery 10 may be excessively increased due to a heat generated in the electrode assembly 100. In this case, a side reaction between the cathode/the anode and the electrolyte may occur, thereby reducing life-span properties and power of the secondary battery 10.

Additionally, a local heat-generation in the electrode assembly 100 may occur, and thus a temperature at an inside the secondary battery 10 may be increased non-uniformly. In this case, a non-uniform reaction and a non-uniform expansion at the inside the secondary battery 10 may be caused. Accordingly, an energy efficiency, a life-span property and a power of the secondary battery 10 may be deteriorated during rapid charging of the secondary battery 10.

For example, a relatively large amount of heat may be generated in the cathode tab 112 and/or the anode tab 114 of the secondary battery 10.

For example, the thermoelectric element columns 210 may be disposed on the surface of the electrode assembly 100 in a series connection or in a parallel connection to control the temperature of the secondary battery 10 described above. As will be described later, the thermoelectric element columns 210 may be heated at an initial stage of the rapid charging of the secondary battery 10 to reach an appropriate temperature in a short period, and may be cooled when the temperature exceeds a certain temperature to prevent an overheating of the secondary battery 10.

However, if the thermoelectric element columns 210 are connected in the series connection, an individual temperature control according to a position of the secondary battery 10 may not be implemented. If the thermoelectric element columns 210 are connected in the parallel connection, an efficiency of current flow may be relatively lowered.

According to exemplary embodiments of the present invention, the circuit structure 150 may include a series/parallel switching unit that may switch the connection between the thermoelectric element columns 210 from the series connection to the parallel connection, or from the parallel connection to the series connection. Accordingly, when the secondary battery 10 is rapidly charged, energy efficiency may be maintained while local and individual cooling or heating may be implemented.

In some embodiments, the series/parallel switching unit may include a plurality of series/parallel switch units corresponding to each of the thermoelectric element columns.

In some embodiments, the series/parallel switching units may include a first series/parallel switching unit 160 that may connect in parallel or separate the neighboring thermoelectric element columns 210, and a second series/parallel switching unit 170 that may connect in series or separate the neighboring thermoelectric element columns 210.

For example, the first series/parallel switching unit 160 may include a first circuit intermediate unit 162 and a first connection unit 164. For example, the first circuit intermediate unit 162 may selectively be in contact with or spaced apart from the first connection unit 164 to connect or disconnect the first series/parallel switching unit 160.

In some embodiments, the first series/parallel switching units 160 may be disposed to be connected to both ends of each of the thermoelectric element columns 210 in the length direction. In this case, the first circuit intermediate unit 162 and the first connection unit 164 disposed at both ends of one thermoelectric element column 210 may be connected, and the first circuit intermediate unit 162 and the first connection unit 164 disposed at both ends of the other thermoelectric element column 210 may be connected so that the thermoelectric element columns 210 may be connected in parallel.

For example, the second series/parallel switching unit 170 may include a second circuit intermediate unit 172 and a second connection unit 174. For example, the second circuit intermediate unit 172 may be selectively in contact with or spaced apart from the second connection unit 174 to connect or disconnect the second series/parallel switching unit 170.

In some embodiments, the second circuit intermediate unit 172 connected to one end of the thermoelectric element column 210 and the second connection unit 174 connected to one end of the adjacent thermoelectric element column 210 may be connected to each other so that the neighboring thermoelectric element columns 210 may be connected in series.

For example, the first and second series/parallel switching units 160 and 170 may be independently controlled for each thermoelectric element column 210. In this case, some of the thermoelectric element columns 210 may be connected in parallel and remaining thermoelectric element columns 210 may be connected in series. Accordingly, the temperature of the secondary battery 10 may be uniformly controlled while improving the energy efficiency.

In some embodiments, a distance between the thermoelectric element columns 210 may be substantially uniform. In this case, a locally independent and predictable temperature control of the secondary battery 10 may be easily implemented by using the above-described parallel connection. Accordingly, durability and rapid charging properties of the secondary battery 10 may be improved.

In some embodiments, each of the thermoelectric element columns 210 may include at least two thermoelectric elements 215 arranged in the width direction.

In some embodiments, each of the thermoelectric elements 215 may include a P-type semiconductor layer (P) and an N-type semiconductor layer (N), and the P-type semiconductor layer (P) and the N-type semiconductor layer may be alternately arranged in each thermoelectric element column 210.

For example, the thermoelectric elements 215 including the P-type semiconductor layer (P) and the N-type semiconductor layer (N) may be disposed in the width direction (e.g., the second direction) of the electrode assembly 100 by the series connection.

In some embodiments, the thermoelectric element columns 210 adjacent in the length direction (e.g., the first direction) of the electrode assembly 100 may be arranged such that the P-type semiconductor layer (P) and the N-type semiconductor layer (N) face each other in the length direction.

For example, the electrode assembly 100 may further include a temperature measuring unit (not illustrated) located in the electrode assembly 100 to measure a temperature for each location of the electrode assembly 100. In this case, the temperature of the secondary battery 10 may be uniformly controlled during the rapid charging by measuring the temperature of each location of the electrode assembly 100, and cooling when the temperature is higher than or equal to a specific temperature and heating when the temperature is lower than the specific temperature.

In some embodiments, the thermoelectric element columns 210 may further include a current supply unit 270 electrically connecting the thermoelectric element 215 and the cathode tab 112 and/or the anode tab 114.

For example, when a heat is generated from the electrode assembly 100 during the rapid charging of the secondary battery 10, a current may be generated from the thermoelectric element 215 as the thermoelectric element 215 is heated. The current may be supplied to the cathode tab 112 and/or the anode tab 114 through the current supply unit 270 to charge the electrode assembly 100.

Accordingly, the current generated from the thermoelectric element 215 may be supplied to the electrode assembly 100 via the current supply unit 270 to additionally charge the secondary battery 10. Thus, a charging efficiency of the secondary battery 10 may be further improved.

In some embodiments, the secondary battery 10 may further include a control unit 280 that may electrically connect the current supply unit 270 and the cathode tab 112 and/or the anode tab 114, and may control an amount of the current flowing between the current supply unit 270 and the electrode tab 112 and 114. For example, when the electrode assembly 100 generates a heat by the current generated from the thermoelectric element 215 through the current supply unit 270, the control unit 280 may reduce an amount of the current supplied to the cathode tab 112 and/or the anode tab 114 from the current supply unit 270.

Thus, the temperature of the electrode assembly 100 may be effectively prevented from exceeding a specific temperature range. Accordingly, the rapid charging properties and a heat resistance of the secondary battery 10 may be further improved.

In some embodiments, the secondary battery 10 may further include a voltage measuring unit that may measure an open-circuit voltage of the electrode assembly 100.

For example, a heat may be generated from the electrode assembly 100 during the charging of the secondary battery 10, and the thermoelectric element 215 may be heated by the heat generated from the electrode assembly 100. As a result, a current may be generated from the thermoelectric element 215 to cause an overcharge of the electrode assembly 100. In this case, the voltage measuring unit may measure the open-circuit voltage of the electrode assembly 100 to determine whether the electrode assembly 100 is overcharged.

Further, when the electrode assembly 100 is overcharged, an amount of current supplied to the electrode assembly 100 may be adjusted by the control unit 280, For example, the control unit 280 may determine whether the electrode assembly 100 is overcharged based on the open-circuit voltage value of the electrode assembly 100 measured by the voltage measuring unit, and may control the amount of current supplied to an inside of the electrode assembly 100. Accordingly, the overcharging of the electrode assembly 100 may be effectively prevented.

For example, the cathode and the anode may each include an electrode current collector including a conductive layer and an active material layer formed on at least one surface of the electrode current collector. The cathode tab 112 and the anode tab 114 may extend from the cathode current collector and the anode current collector, respectively, and may be exposed to an outside of the secondary battery 10 to be connected to an external electronic device.

For example, the cathode tab 112 and the anode tab 114 may include a metallic material such as gold (Au), silver (Ag), copper (Cu), aluminum (Al), etc.

Figure 2:
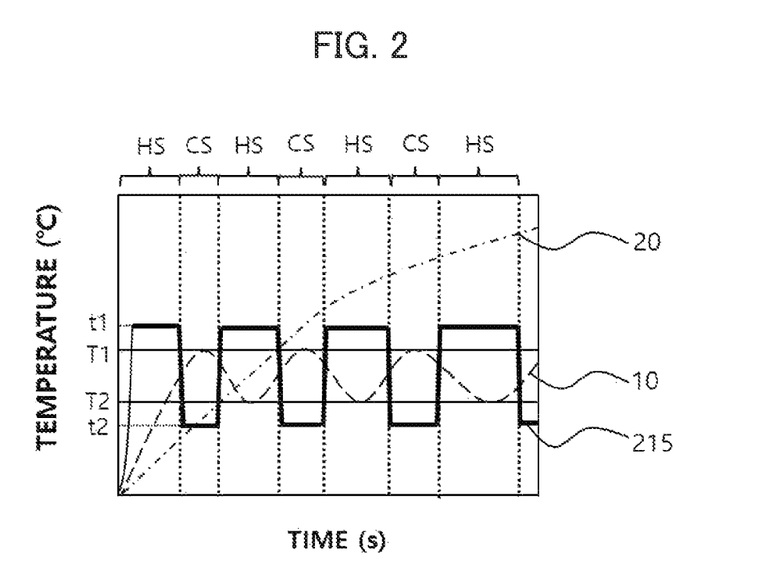
FIG. 2 is a schematic graph showing a temperature change for explaining a method of a temperature control in a secondary battery in accordance with exemplary embodiments.

FIG. 2 is a schematic graph showing a temperature change for explaining a method of a temperature control in a secondary battery in accordance with exemplary embodiments.

Referring to FIG. 2, a temperature of the electrode assembly 100 or the secondary battery 10 may be increased through a heating section HS in which the thermoelectric elements 215 may generate a heat to reach an upper critical temperature T1.

When the secondary battery 10 according to exemplary embodiments including the thermoelectric element columns 210 reaches the upper critical temperature T1, the heat generation of the thermoelectric element 215 may be stopped, and the electrode assembly 100 or the secondary battery 10 may reach a lower critical temperature 12 through a cooling section CS in which the thermoelectric elements 215 may be cooled. In this case, the heat absorbed from the electrode assembly 100 may be converted into an electricity by the thermoelectric element 215.

For example, the above-described operations may be repeated and the temperature of the electrode assembly 100 or the secondary battery 10 may be maintained within a predetermined range. Accordingly, the secondary battery 10 may be rapidly heated to a predetermined temperature while being charged, and then cooling and heating may be repeated to increase the charging efficiency while preventing damages to the secondary battery 10 due to an excessive temperature increase.

In some embodiments, the upper critical temperature T1 may be from 50° C. to 60° C., and the lower critical temperature T2 may be from 40° C. to 50° C. In this case, the temperature of the secondary battery 10 may be appropriately adjusted in a range from 45° C. to 55° C. while being charged.

For example, in a secondary battery 20 (e.g., a secondary battery of Comparative Example 1) in which the thermoelectric elements 215 are not included, as shown in FIG. 2, the secondary battery 20 may be heated slowly at an initial stage of charging, and a temperature of the battery 20 may increase excessively during the charging. Accordingly, the charging efficiency and life-span properties of the secondary battery 20 may be degraded.

For example, a lithium plating forming a plating film by lithium ions on the anode may be caused due to the charging at a low temperature in the initial stage, and a thermal effect due to a battery reaction at a high temperature in a later stage may be caused to deteriorate the life-span and capacity properties of the battery.

In some embodiments, a maximum heating temperature t1 of the thermoelectric element 215 in the heating section HS may vary according to the upper critical temperature T1 of the secondary battery 10. For example, when the upper critical temperature T1 of the secondary battery 10 is from 50° C. to 60° C., the maximum heating temperature t1 of the thermoelectric element 215 may be from 55° C. to 65° C.

In some embodiments, a minimum cooling temperature t2 of the thermoelectric element 215 in the cooling section CS may vary according to the lower critical temperature T2 of the secondary battery 10. For example, when the lower critical temperature T2 of the secondary battery 10 is from 40° C. to 50° C., the minimum cooling temperature t2 of the thermoelectric element 215 may be from 35° C. to 45° C.

Within the above-described range, the temperature of the secondary battery 10 may be appropriately adjusted according to the heat generation and cooling of the thermoelectric element 215.

For example, the above-described method for controlling the temperature of the thermoelectric element 215 may be individually and locally applied to each region of the electrode assembly 100 in which the thermoelectric element column 210 is located. In an embodiment, the first series/parallel switching unit 160 may be connected and the second series/parallel switching unit 170 may be separated at the thermoelectric element column 210 at which a temperature is controlled, so that the thermoelectric element columns 210 may be connected in parallel. Accordingly, cooling or heating for each region of the electrode assembly 100 may be implemented.

Figure 3:
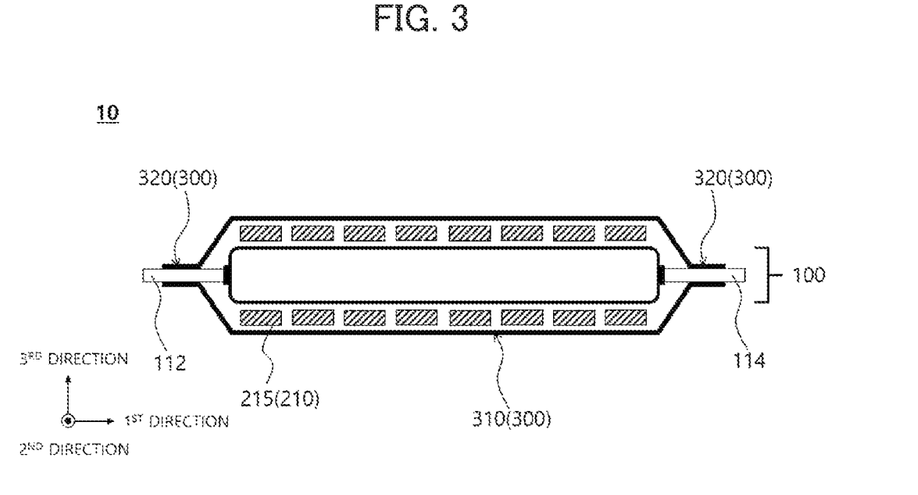
FIGS. 3 and 4 are schematic cross-sectional views illustrating secondary batteries in accordance with exemplary embodiments.
Figure 4:
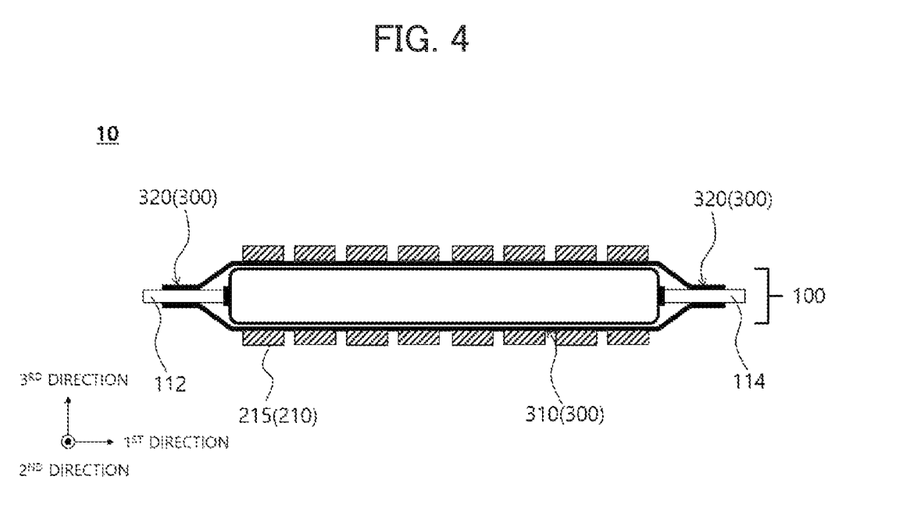

FIGS. 3 and 4 are schematic cross-sectional views illustrating secondary batteries in accordance with exemplary embodiments.

Referring to FIGS. 3 and 4, the thermoelectric element columns 210 may be disposed on both top and bottom surfaces of the electrode assembly 100. Thus, the electrode assembly 100 may be heated or cooled through both the upper and bottom surfaces of the electrode assembly 100, so that the temperature control may be implemented more rapidly.

For example, the number of thermoelectric element columns 210 disposed on the electrode assembly 100 may be 4 or more, preferably 6 or more. In this case, a fine control of the temperature for each position or region of the electrode assembly 100 may be performed so that more uniform temperature control may be implemented during the rapid charging.

For example, the secondary battery 10 may further include a case 300 accommodating the electrode assembly 100. For example, the case 300 may be sealed so that the electrode tab 112 and 114 included in the electrode assembly 100 may protrude to the outside.

As illustrated in FIG. 3, the thermoelectric element columns 210 may be accommodated in the case 300 together with the electrode assembly 100. In this case, the thermoelectric element columns 210 may be accommodated together with the electrode assembly 100 at an inside of the case, so that a shock applied to the thermoelectric element columns 210 from the outside may be effectively alleviated by the case 300.

Thus, a mechanical durability of the secondary battery 10 and the thermoelectric element columns 210 may be improved. Additionally, the thermoelectric element columns 210 may directly contact the electrode assembly 100, and the temperature of the electrode assembly 100 may be controlled more efficiently.

As illustrated in FIG. 4, the electrode assembly 100 may be only accommodated in the case 300, and the thermoelectric element columns 210 may be disposed at an outside of the case 300. For example, the thermoelectric element columns 210 may be directly disposed on an outer surface of the case 300. For example, the case 300 may be disposed between the thermoelectric element columns 210 and the electrode assembly 100.

In this case, the thermoelectric element columns 210 may not be accommodated in the case 300 filled with the electrolyte, so that deterioration of durability of the thermoelectric element columns 210 by the electrolyte may be effectively prevented. Further, reduction of the life-span of the secondary battery 10 due to a side reaction between the electrolyte and the thermoelectric element columns 210 may also be prevented.

For example, the case 300 may include a housing portion 310 in which the electrode assembly 100 may be accommodated, and a sealing portion 320.

For example, the housing portion 310 may have a recess shape formed by being pressed to a predetermined depth from the sealing portion 320 in the thickness direction (e.g., a third direction) of the electrode assembly. The electrode assembly 100 may be inserted into the housing portion 310. The housing portion 310 may have a size and a shape into which the electrode assembly 100 may be inserted.

In exemplary embodiments, the housing portion 310 may be divided into a first portion covering the top surface of the electrode assembly 100 and a second portion covering the bottom surface of the electrode assembly 100. The first portion may accommodate an upper portion of the electrode assembly, and the second portion may accommodate a lower portion of the electrode assembly. In some embodiments, the lower portion of the electrode assembly may be inserted into the second portion, and the first portion may cover the upper portion of the first electrode assembly.

For example, the first portion and the second portion may be disposed to face each other, and a portion located around a periphery of the first portion and a portion located around a periphery of the second portion may contact each other to form the sealing portion 320. For example, the case 300 may be formed by pressing or fusion bonding of the sealing portion 320, and the electrode assembly 100 and the thermoelectric element columns 210 may be encapsulated within the case 300.

For example, the cathode tab 112 and the anode tab 114 may be sealed such that portions of the cathode tab 112 and the anode tab 114 may protrude to the outside of the case 300. The cathode tab 112 and the anode tab 114 may be sealed such that portions of the cathode tab 112 and the anode tab 114 may protrude from the sealing portion 320. For example, an insulating film may be interposed between a sealed portion of the cathode tab 112 and/or the anode tab 114 and the sealing portion 320.

For example, the insulating film may maintain an insulation between the cathode tab 112 and/or the anode tab 114 and the case 300 even when the case 300 is damaged. Further, an adhesion between the cathode tab 112 and/or the anode tab 114 and the sealing portion 320 may be improved.

In some embodiments, the case 300 may include a single housing portion formed to a depth corresponding to thicknesses of the electrode assembly 100 and the thermoelectric element columns 210. In this case, facing surfaces of the single housing portion may have a flat or planar shape.

The electrolyte may be injected into an inner space of the case 300 formed by the housing portion 310.

For example, the case 300 may include a metal layer, an upper insulating layer formed on the metal layer, and a lower insulating layer formed under the metal layer.

For example, the metal layer may prevent external moisture, gas, etc., from penetrating into the electrode assembly 100. The metal layer may prevent a chemical substance injected into the case 300 from being leaked to the outside while improving a mechanical strength of the case 300.

For example, the metal layer may include iron (Fe), chromium (Cr), manganese (Mn), nickel (Ni), aluminum (Al), an alloy thereof, etc. The metal layer may include, e.g., carbon. For example, aluminum (Al) may be included in the metal layer in consideration of, e.g., a flexibility of the metal layer.

For example, a thickness of the metal layer may be from about 30 μm to 50 μm, preferably from about 35 μm to 45 μm.

For example, the upper insulating layer and the lower insulating layer may be directly formed on the metal layer or may be bonded to the metal layer by an adhesive layer.

For example, the upper insulating layer may insulate the inside and the outside of the secondary battery 10.

For example, the upper insulating layer may include polyethylene, polypropylene, poly carbonate, polyethylene terephthalate, polyvinyl chloride, acrylic polymer, polyacrylonitrile, polyimide, polyamide, cellulose, aramid, nylon, polyester, polyparaphenylenebenzobisoxazole, poly arylate, Teflon, glass fiber, etc. The upper insulating layer may have a single-layered structure formed of any one of the above materials, or a composite film structure formed of at least two of the above materials.

Preferably, polyethylene terephthalate or nylon may be used. For example, biaxially stretched nylon may be used. For example, a thickness of the upper insulating layer may be from about 20 μm to 30 μm.

For example, the lower insulating layer may provide an inner surface of the case 300. For example, the lower insulating layers facing each other in the thickness direction may be fused in a sealing process to form the sealing portion 320.

For example, the lower insulating layer may include a fusible material, and the case 300 may be sealed by, e.g., a thermal fusion.

For example, the lower insulating layer may include polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylenebenzobisoxazole, polyarylate, Teflon, glass fiber, etc. The lower insulating layer may have a single-layered structure formed of any one of the above materials, or a composite film structure formed of at least two of the above materials.

Preferably, a laminate of a homo polypropylene film and a modified polypropylene film may be used. For example, a total thickness of the lower insulating layer may be from about 60 μm to 100 μm, preferably from about 70 μm to 90 μm.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLE

An electrode assembly including a cathode, an anode and a separation layer, and including a cathode tab connected to the cathode and an anode tab connected to the anode was prepared.

Thermoelectric element columns were arranged on an upper surface of the electrode assembly with a uniform interval along a length direction of the electrode assembly, and a circuit structure was formed as illustrated in FIG. 1.

Thereafter, the electrode assembly, the thermoelectric element columns and the circuit structure were accommodated in a case, an electrolyte was injected, and the case was sealed to fabricate a secondary battery.

Comparative Example 1

A secondary battery was fabricated by the same method as that in Example 1, except that the thermoelectric element column was not included.

Comparative Example 2

A secondary battery was fabricated by the same method as that in Example 1, except that the thermoelectric element columns were all connected in series.

Comparative Example 3

A secondary battery was fabricated by the same method as that in Example 1, except that the thermoelectric element columns were all connected in parallel.

Experimental Example (1) Measurement of Temperature of Electrode Tab

The secondary batteries fabricated according to Examples and Comparative Examples 1 to 3 were subjected to a rapid charging, and a maximum temperature of the electrode tab was measured.

(2) Evaluation on Charging Time

The secondary batteries fabricated according to Examples and Comparative Examples 1 to 3 were charged from SOC0 to SOC80 (CC-CV 4.1V 5 C-rate SOC80 capacity cut-off), and a time required for the charging was measured.

(3) Evaluation on Cycle Property

The secondary batteries fabricated according to Examples and Comparative Examples 1 to 3 were charged (CC-CV 4.1V 5 C-rate SOC80 capacity cut-off) and left for 10 minutes, and then discharged (CC 1/3 C-rate 2.5V cut-oft) off) and left for 10 minutes (1 cycle). The cycle was repeated to a 80% SOFT (State of Health) and the number of the performed cycles was measured.

The results are shown in Table 1 below.

TABLE 1

| No. | Maximum temperature at electrode tab (° C.) | Time for rapid charging (minutes) | Cycle property (the number of performed cycles) |
| --- | --- | --- | --- |
| Example | 55 | 18 | 900 |
| Comparative Example 1 | 70 | 30 | 500 |
| Comparative Example 2 | 55 | 25 | 800 |
| Comparative Example 3 | 55 | 23 | 800 |

Referring to Table 1, the secondary battery of Example where the thermoelectric element columns and the circuit structure including the series/parallel switching unit were included provided the maximum temperature of the electrode tab during the rapid charging lower than that from Comparative Example 1 that did not include the thermoelectric element columns. Further, the secondary battery of Example provided the rapid charging time smaller than those from Comparative Examples, and the improved cycle property compared to those from Comparative Examples.

In Comparative Example 2 where the series/parallel switching unit was not included and the thermoelectric element columns were connected only in series, and Comparative Example 3 where the series/parallel switching unit was not included and the thermoelectric element columns were connected only in parallel, the rapid charging and life-span properties were improved relatively to those from Comparative Example 1, but the time for the rapid charging and the life-span property were degraded compared to those from Example.

What is claimed is:

1. A secondary battery, comprising:
   an electrode assembly comprising a cathode and an anode facing the cathode;
   thermoelectric element columns arranged in parallel on a surface of the electrode assembly; and
   a circuit structure that electrically connects the thermoelectric element columns, the circuit structure comprising a plurality of series/parallel switching units configured to switch a connection between the thermoelectric element columns from a series connection to a parallel connection or from a parallel connection to a series connection,
   wherein each of the thermoelectric element columns includes at least two thermoelectric elements connected in series,
   wherein the plurality of series/parallel switching units comprises:
   a plurality of first series/parallel switching units, each connected to both ends of respective thermoelectric element columns and configured to selectively connect the thermoelectric element columns to the circuit structure in parallel;
   a plurality of second series/parallel switching units, each disposed between end portions on the same side of alternating adjacent thermoelectric element columns, and configured to selectively connect the adjacent thermoelectric element columns in series;
   wherein the plurality of first series/parallel switching units or the plurality of second series/parallel switching units are independently controlled for each of the thermoelectric element columns.

2. The secondary battery of claim 1, wherein the thermoelectric element columns are arranged along a length direction of the electrode assembly.

3. The secondary battery of claim 1, wherein each of the plurality of first series/parallel switching units comprises a first connection unit and a first circuit intermediate unit that is selectively in contact with or spaced apart from the first connection unit, and
   each of the plurality of second series/parallel switching units comprises a second connection unit, and a second circuit intermediate unit that is selectively in contact with or spaced apart from the second connection unit.

4. The secondary battery of claim 1, wherein distances between the thermoelectric element columns are uniform.

5. The secondary battery of claim 1, wherein the at least two thermoelectric elements are arranged in a width direction of the electrode assembly.

6. The secondary battery of claim 5, wherein each of the thermoelectric elements comprises a P-type semiconductor layer and an N-type semiconductor layer, and
   the P-type semiconductor layer and the N-type semiconductor layer are alternately arranged in each of the thermoelectric element columns.

7. The secondary battery of claim 6, wherein the thermoelectric element columns are arranged so that the P-type semiconductor layer and the N-type semiconductor layer face each other in a length direction of the electrode assembly.

8. The secondary battery of claim 1, wherein some of the thermoelectric element columns are connected to each other in parallel, and remaining ones of the thermoelectric element columns are connected to each other in series.

9. The secondary battery of claim 1, wherein the electrode assembly further comprises a cathode tab protruding from the cathode and an anode tab protruding from the anode, and
   the cathode tab and the anode tab are electrically connected to at least one of the thermoelectric element columns.

10. The secondary battery of claim 1, further comprising a case accommodating the electrode assembly and the thermoelectric element columns.

11. The secondary battery of claim 1, further comprising a case accommodating the electrode assembly,
   wherein the thermoelectric element columns are disposed at an outside of the case.

\* \* \* \* \*